(12) United States Patent
Yabe et al.

(10) Patent No.: US 7,209,756 B2
(45) Date of Patent: *Apr. 24, 2007

(54) INFORMATION RETRIEVAL METHOD AND RELAY CENTER

(75) Inventors: Toshiyasu Yabe, Chiba (JP);
Mitsutoshi Aizawa, Inzai (JP);
Nobuyuki Ikeda, Koshigaya (JP);
Takashi Koganemaru, Funabashi (JP)

(73) Assignee: NTT DoCoMo, Inc., Tokyo (JP)

( * ) Notice: Subject to any disclaimer, the term of this patent is extended or adjusted under 35 U.S.C. 154(b) by 271 days.

This patent is subject to a terminal disclaimer.

(21) Appl. No.: 10/182,423

(22) PCT Filed: Nov. 27, 2001

(86) PCT No.: PCT/JP01/10321

§ 371 (c)(1),
(2), (4) Date: Jul. 25, 2002

(87) PCT Pub. No.: WO02/42936

PCT Pub. Date: May 30, 2002

(65) Prior Publication Data

US 2003/0013458 A1 Jan. 16, 2003

(30) Foreign Application Priority Data

Nov. 27, 2000 (JP) ............................. 2000-360283

(51) Int. Cl.
*H04Q 7/20* (2006.01)

(52) U.S. Cl. .............................. 455/456.3; 456/456.1; 456/456.5; 456/457; 709/245; 342/357.09; 701/207

(58) Field of Classification Search .. 455/456.1–456.3, 455/456.5, 457, 414.1, 456.4, 456.6, 404.2; 707/3, 4; 709/217–219, 245; 701/200–213; 342/357.1, 357.06, 357.09, 357.01, 357.08

See application file for complete search history.

(56) References Cited

U.S. PATENT DOCUMENTS 5,548,586 A 8/1996 Kito et al.

(Continued)

FOREIGN PATENT DOCUMENTS

CA 2241273 A1 5/1998

(Continued)

OTHER PUBLICATIONS

N. Miura et al., "Mobile Info Search: User-Centered Search Mechanism of WWW in Mobile Environment", NTT Software Laboratories, Mobile Computing 3-7. Dec. 5, 1997.

(Continued)

*Primary Examiner*—Joseph Feild
*Assistant Examiner*—Kamran Afshar
(74) *Attorney, Agent, or Firm*—Brinks Hofer Gilson & Lione (57) ABSTRACT

Base station BS adds a base station ID for specifying itself to a signal transmitted from mobile station MS. Data distribution management unit GWS3 of gateway server GWS extracts the base station ID added to a GET request and reads out an area name corresponding to the base station ID from area name conversion table TBL. Data distribution management unit GWS3, using the area name as a search key, searches location-related information database GWS4 for location-related information corresponding to a present location of mobile station MS and transmits the information to mobile station MS.

20 Claims, 10 Drawing Sheets

U.S. PATENT DOCUMENTS

| | | | |
|---|---|---|---|
| 5,778,315 A * | 7/1998 | Proietti | 455/432.3 |
| 5,796,351 A | 8/1998 | Yabuki | |
| 5,889,770 A | 3/1999 | Jokiaho et al. | |
| 5,930,699 A | 7/1999 | Bhatia | |
| 6,108,533 A | 8/2000 | Brohoff | |
| 6,148,198 A | 11/2000 | Anderson et al. | |
| 6,202,023 B1 * | 3/2001 | Hancock et al. | 701/213 |
| 6,256,498 B1 | 7/2001 | Ludwig | |
| 6,259,405 B1 | 7/2001 | Stewart et al. | |
| 6,259,923 B1 * | 7/2001 | Lim et al. | 455/456.2 |
| 6,405,034 B1 * | 6/2002 | Tijerino | 455/414.3 |
| 6,434,381 B1 | 8/2002 | Moore et al. | |
| 6,556,997 B1 * | 4/2003 | Levy | 707/10 |
| 6,629,136 B1 | 9/2003 | Naidoo | |
| 6,650,902 B1 | 11/2003 | Richton | |
| 6,789,102 B2 * | 9/2004 | Gotou et al. | 709/203 |
| 6,795,710 B1 * | 9/2004 | Creemer | 455/456.3 |
| 6,807,571 B2 * | 10/2004 | Hatano et al. | 709/219 |
| 6,813,502 B2 | 11/2004 | Son et al. | |
| 6,947,754 B2 * | 9/2005 | Ogasawara | 455/456.3 |
| 2001/0044310 A1 | 11/2001 | Lincke | |
| 2002/0138650 A1 * | 9/2002 | Yamamoto et al. | 709/245 |
| 2002/0164995 A1 | 11/2002 | Brown et al. | |
| 2004/0110515 A1 | 6/2004 | Blumberg et al. | |

FOREIGN PATENT DOCUMENTS

| | | | |
|---|---|---|---|
| EP | 0 848 564 A2 | 6/1998 | |
| JP | H08-289117 A | 11/1996 | |
| JP | 9-8917 | 1/1997 | |
| JP | 09-172672 A | 6/1997 | |
| JP | 09-182143 A | 7/1997 | |
| JP | 9-305518 | 11/1997 | |
| JP | 9-319300 | 12/1997 | |
| JP | 10-161534 | 6/1998 | |
| JP | 10-178674 A | 6/1998 | |
| JP | H11-055317 | 2/1999 | |
| JP | 11-72347 | 3/1999 | |
| JP | H11-069422 A | 3/1999 | |
| JP | 11-187469 | 7/1999 | |
| JP | H11-285054 A | 10/1999 | |
| JP | H11-355302 | 12/1999 | |
| JP | 2000-76280 A | 3/2000 | |
| JP | 2000-115857 A | 4/2000 | |
| JP | 2000-216721 A | 8/2000 | |
| JP | 2000-241525 A | 9/2000 | |
| JP | 2000-298670 A | 10/2000 | |
| KR | 2000-6760 | 2/2000 | |
| TW | 87112562 | 10/2000 | |
| WO | WO 98/21913 A2 | 5/1998 | |
| WO | WO 99/11078 A1 | 3/1999 | |
| WO | WO 00/04730 A1 | 1/2000 | |
| WO | WO 00/30380 A1 | 5/2000 | |

OTHER PUBLICATIONS

3G TS 23.121 v3.0.0, "3GPP; Technical Specification Group Services and Systems Aspects; Architectural Requirements for Release 1999", Jul. 1999.

ETSI TS 123 073 v3.0.0, "Digital Cellular Telecommunications System (Phase 2+)(GSM); Universal Mobile Telecommunications System (UMTS); Support of Localized Service Area SoLSA); Stage 2" Jan. 2000.

ETSI TS 101 528 v8.1.0 "Digital Cellular Telecommunications System (Phase 2+); Location Services (LCS); Broadcast Network Assistance for Enhanced Observed Time Difference (E-OTD) and Global Positioning System (GPS) Positioning Methods", Jun. 2000.

ETSI 3G TS 22.071 v3.2.0, "3GPP; Technical Specification Group Services and System Aspects; Location Services (LCS); Service Description, Stage 1", Dec. 1999.

3G TS 23171 1.0.0 "3GPP; Technical Specification Group Services and System Aspects; Functional Stage 2 Description of Location Services in UMTS" Oct. 1999.

3G TR 25.923 v1.1.0 "3GPP; Technical Specification Group (TSG) Ran; Working group 2 (WG2); Report on Location Services (LCS)" Aug. 1999.

* cited by examiner

```
<HTML>
<HEAD>
<TITLE>MAIN MENU</TITLE>
<META name="xx" content="xx">
</HEAD>
<CENTER>
<H2><IMG src="xxGIF" alt="MAIN MENU"
height="30" width="200"><FONT color="#004000">
MAIN MENU</FONT></H2>
</CENTER>
<BODY>
<BR>
<A href="http://www.gws.ne.jp/aa">◎LOCATION-RELATED INFORMATION
</A>
<FONT size="-1"><BR>
INFORMATION ABOUT THE VICINITY OF YOUR PRESENT LOCATION WILL BE
PROVIDED!! </FONT><BR>
<BR>
<A href="http://www.gws.ne.jp/bb">◎NEWS </A>
<FONT size="-1"><BR>
TODAY' NEWS!! </FONT><BR>
<BR>
<A href="http://www.gws.ne.jp/cc">◎BANKING</A>
<FONT size="-1"><BR>
FUNDS TRANSFER, FUNDS DEDUCTION </FONT><BR>
<BR>
<A href="http://www.gws.ne.jp/dd">◎ABOUT THIS SERVICE</A>
<FONT size="-1"><BR>
</BODY>
</HTML>
```

FIG. 4B

MAIN MENU

◎LOCATION-RELATED INFORMATION
INFORMATION ABOUT THE VICINITY OF YOUR PRESENT LOCATION WILL BE PROVIDED!!

◎NEWS
TODAY' NEWS!!

◎BANKING
FUNDS TRANSFER, FUNDS DEDUCTION

◎ABOUT THIS SERVICE

FIG. 5

| BASE STATION ID | AREA NAME | | | | | |
|---|---|---|---|---|---|---|
| BS001 ~ BS005 | 1-CHOME, SHIBUYA | ... | ... | ... | ... | ... |
| ... | ... | ... | ... | ... | ... | ... |

TBL

FIG. 6

LOCATION-RELATED INFORMATION (RESTAURANT INFORMATION)

| SHOP NAME | AREA NAME | LINK DESTINATION URL | TELEPHONE NUMBER |
|---|---|---|---|
| RESTAURANT A | 1-CHOME, SHIBUYA | http://aa.ne.jp | 03-1111-1111 |
| RESTAURANT B | 3-CHOME, EBISU | http://bb.ne.jp | 03-2222-2222 |
| ... | ... | ... | ... |

LOCATION-RELATED INFORMATION (MOVIE THEATER INFORMATION)

| SHOP NAME | AREA NAME | LINK DESTINATION URL | TELEPHONE NUMBER |
|---|---|---|---|
| MOVIE THEATER A | 1-CHOME, SHIBUYA | http://cc.ne.jp | 03-3333-3333 |
| MOVIE THEATER B | 3-CHOME, SHINJUKU | http://dd.ne.jp | 03-4444-4444 |
| ... | ... | ... | ... |

LOCATION-RELATED INFORMATION (SHOP INFORMATION)

| SHOP NAME | AREA NAME | LINK DESTINATION URL | TELEPHONE NUMBER |
|---|---|---|---|
| SHOP A | 1-CHOME, SHIBUYA | http://ee.ne.jp | 03-5555-5555 |
| SHOP B | 2-CHOME, NIHONBASHI | http://ff.ne.jp | 03-6666-6666 |
| ... | ... | ... | ... |

| AREA NAME | SUBMENU DATA |
|---|---|
| 1-CHOME, SHIBUYA | RESTAURANT INFORMATION |
| | MOVIE THEATER INFORMATION |
| | SHOP INFORMATION |
| | ... |
| ... | ... |
| ... | ... |
| ... | ... |

LOCATION-RELATED INFORMATION (RESTAURANT INFORMATION IN 1-CHOME, SHIBUYA)

| SHOP NAME | LINK DESTINATION URL | TELEPHONE NUMBER |
|---|---|---|
| RESTAURANT A | http://aa.ne.jp | 03-1111-1111 |
| ... | ... | ... |

LOCATION-RELATED INFORMATION (MOVIE THEATER INFORMATION IN 1-CHOME, SHIBUYA)

| SHOP NAME | LINK DESTINATION URL | TELEPHONE NUMBER |
|---|---|---|
| MOVIE THEATER A | http://dd.ne.jp | 03-3333-3333 |
| ... | ... | ... |

LOCATION-RELATED INFORMATION (SHOP INFORMATION IN 1-CHOME, SHIBUYA)

| SHOP NAME | LINK DESTINATION URL | TELEPHONE NUMBER |
|---|---|---|
| SHOP A | http://ee.ne.jp | 03-5555-5555 |
| ... | ... | ... |

INFORMATION RETRIEVAL METHOD AND RELAY CENTER

TECHNICAL FIELD

The present invention relates to a relay center and an information retrieval method for searching information on a network by using location information of a mobile station.

BACKGROUND ART

In recent years, in a mobile communication network using cellular telephones, a system for acquiring a present location of a mobile station (hereinafter referred to as location information) has steadily become commercially viable An example of such a system is as follows. On a PHS (Personal Handy Phone System; Registered Trademark) network a base station receives radio waves from a mobile station and is able to determine an approximate present location of a mobile station on the basis of the location of the base station. Another method which has been suggested for acquiring location information of a mobile station is by utilizing a mobile station having a GPS (Global Positioning System) installed. Possible uses of this location information are, for example, services such as showing the location of a mobile station over a map on a display of a personal computer via a network or providing a user by facsimile with the location of a mobile station and information about adjacent areas.

In recent years, mobile devices with a WWW (World Wide Web) browser, which can connect to the Internet, have been commercially available. Using such a mobile device a user can search for information about restaurants and shops in the vicinity of the user, for example, by accessing a search engine on a web. In these cases, it is very convenient to be able to acquire the desired information relating to the present location by providing a retrieval server with location information.

However, because location information is highly confidential it is undesirable to distribute location information on the Internet.

DISCLOSURE OF INVENTION

The present invention provides a relay center and an information retrieval method that can search for information on a network by utilizing location information of a mobile station while protecting the privacy of a user.

The information retrieval method of the present invention comprises (a) a step of acquiring, in a relay center, location information corresponding to a mobile station, the relay center being connected to a first network and a second network including the mobile station, (b) a step of converting, in the relay center, location information acquired in the acquiring step into a character string, (c) a step of proxy retrieval in which the relay center instructs a server connected to the first network to search for information relating to the character string and acquires information from the server, (d) a step of transmitting, by the relay center, information acquired in the proxy retrieval step to the mobile station. The character string represents, for example, an administrative classification corresponding to the location information.

Also, in a preferred form, the relay center includes a database which stores a character string representing location information, and corresponding information relating to the location. In the case that the relay center searches for information relating to the character string and does not find corresponding information, the relay center, in the step of proxy retrieval step, instructs the server to search for information relating to the character string.

Information relating to the character string may include a URL of the server providing information.

A further step may be included wherein, in the step of proxy retrieval step the server is instructed to search for information relating to the character string and stores the character string and information in the database when the information is acquired from the server.

In another preferred form, the second network is a mobile communication network; and the location information is identification information of the base station communicating with the mobile station included in the mobile communication network.

A relay center of the present invention connected to a first network and a second network including a mobile station comprises (a) means for acquiring location information corresponding to the mobile station, (b) means for converting acquired location information in the form of a character string, (c) proxy retrieval means instructing the server connected to the first network to search for information relating to the character string and acquiring information from the server, and (d) means for transmitting acquired information to the mobile station.

In another preferred form, the relay center, further including a database which stores a character string representing location information and corresponding information relating to the location information, searches the database for information relating to the character string and, in the case that the relay center does not find corresponding information instructs the server to search for information relating to the character string.

Further, the relay center may instruct the server to search for information relating to the character string and store the character string and the corresponding information in the database in case the information is acquired from the server.

BEST MODE FOR CARRYING OUT THE INVENTION

Embodiments of the present invention will be explained below with reference to the drawings. These embodiments are communication systems which are realized by applying the present invention to a mobile communication network connected to the Internet.

[1] First Embodiment

[1.1] Configuration of First Embodiment (1) Configuration of Entire System

Figure 1:
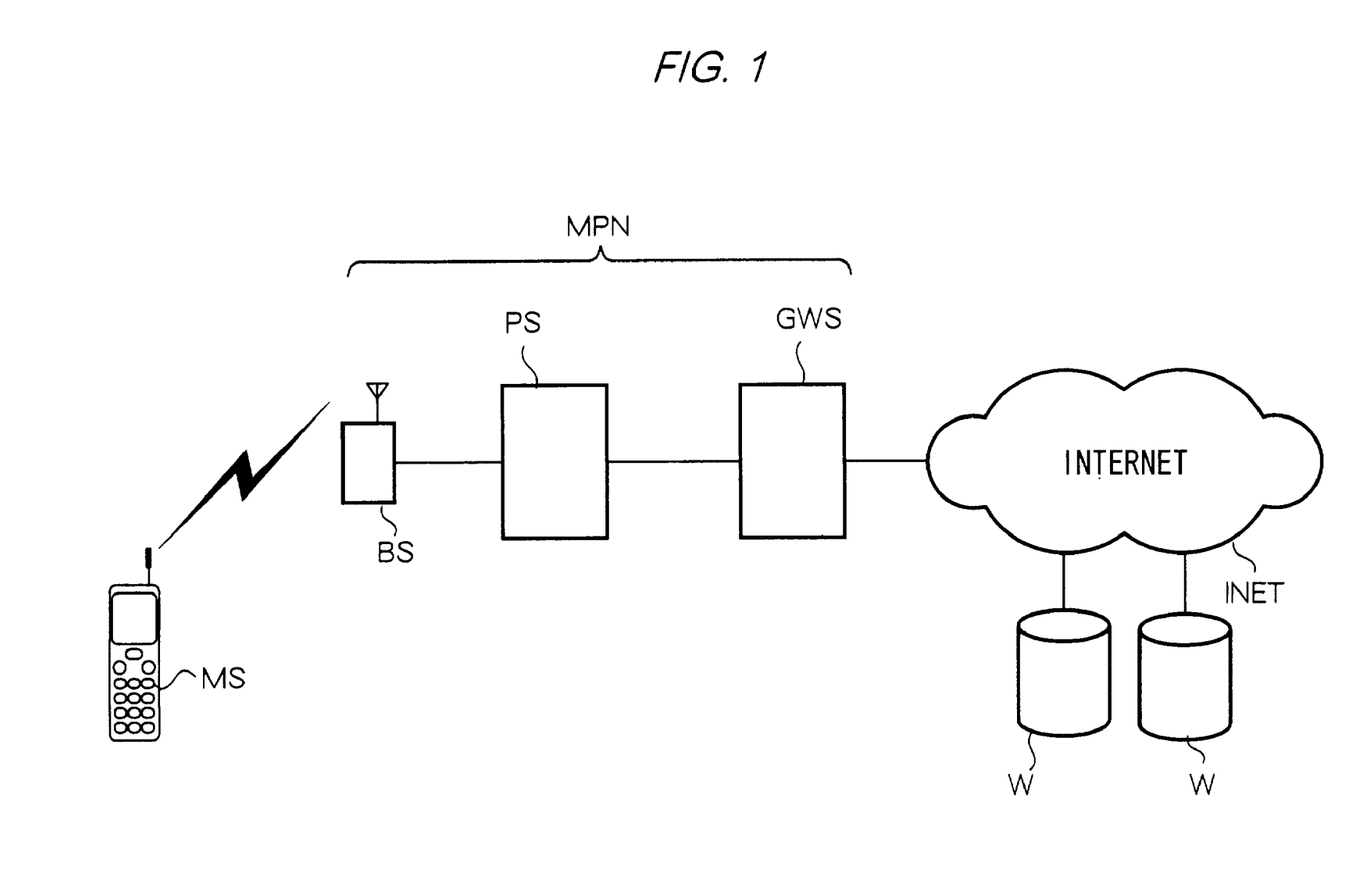
FIG. 1 is a block diagram showing the configuration of a mobile communication system according to the first embodiment.

FIG. 1 is a block diagram showing the configuration of a mobile communication system according to the first embodiment. As shown in FIG. 1, the mobile communication system comprises a plurality of mobile stations MS, mobile packet communication network MPN, Internet INET, a plurality of IP servers W and so on. For the sake of simplicity, FIG. 1 illustrates only one mobile station MS and IP server W among a plurality of mobile stations MS and IP servers W included in the mobile communication system.

Mobile station MS is a mobile communication terminal such as a portable telephone or a PHS and receives a packet communication service of mobile packet communication network MPN and a communication service of a mobile telephone network not shown. Mobile station MS comprises a voice input/output unit such as a microphone or a speaker for letting a user carry out voice communication; a transmitter-receiver unit for carrying out radio communication with a base station of the mobile communication network; a liquid crystal display unit utilizing a liquid crystal panel or the like; a command inputting unit using a PB (push button) or a cursor button and so on, by way of which an information inputting operation is performed; and a microcomputer for controlling these various units.

Mobile packet communication network MPN is for providing mobile station MS with packet communication service, and comprises base station BS, packet subscriber processing unit PS, gateway server GWS and so on.

A multiplicity of base stations BS are installed at predetermined intervals in the packet communication service area performing radio communications with mobile stations MS located in each radio zone. Base station BS is assigned a base station ID for specifying each base station BS in mobile packet communication network MPN, and when an up signal (for example, a GET request of HTTP) is transmitted from mobile station MS, base station BS adds the base station ID of itself to the up signal and transmits the signal to packet subscriber processing unit PS. Thus, the base station ID of base station BS is added to the up signal transmitted from mobile station MS by the time the signal is received by gateway server GWS.

Packet subscriber processing unit PS is a computer system installed in a packet subscriber switching station including a plurality of base stations BS and each packet subscriber processing unit PS has a unique packet subscriber processing unit ID. Packet subscriber processing unit PS, at the request of mobile station MS for packet switching, confirms the validity of the received packet switching request, and performs the process of packet switching.

Gateway server GWS is a computer system installed in the mobile packet switching station for connecting Internet INET with mobile packet communication network MPN and acts as an intermediary for signal transmission and reception between different networks. Specifically, gateway server GWS adapts a signal transmitted from mobile station MS in mobile packet communication network MPN to TCP/IP (Transmission Control Protocol/Internet Protocol) for Internet INET by a protocol conversion and transmits the signal to Internet INET. Also, gateway server GWS converts a signal transmitted from Internet INET so as to adapt to a transmission protocol for the packet communication network and transmits the signal to mobile packet communication network MPN.

According to the present embodiment, gateway server GWS determines the present location of mobile station MS on the basis of the signal transmitted from mobile station MS and sends information about the vicinity of the present location of mobile station MS (hereinafter referred to as location-related information) to mobile station MS.

IP (Information Provider) server W is a server on the Internet and stores information to be supplied to the user (for example, a home page) as HTML data. IP server W has a URL to uniquely specify an information resource on the Internet. When this URL is identical to the URL in a received GET request, IP server W transmits information corresponding to the URL (i.e., HTML data in HTTP format) to Internet INET.

(2) Configuration of Mobile Station MS

Figure 2:
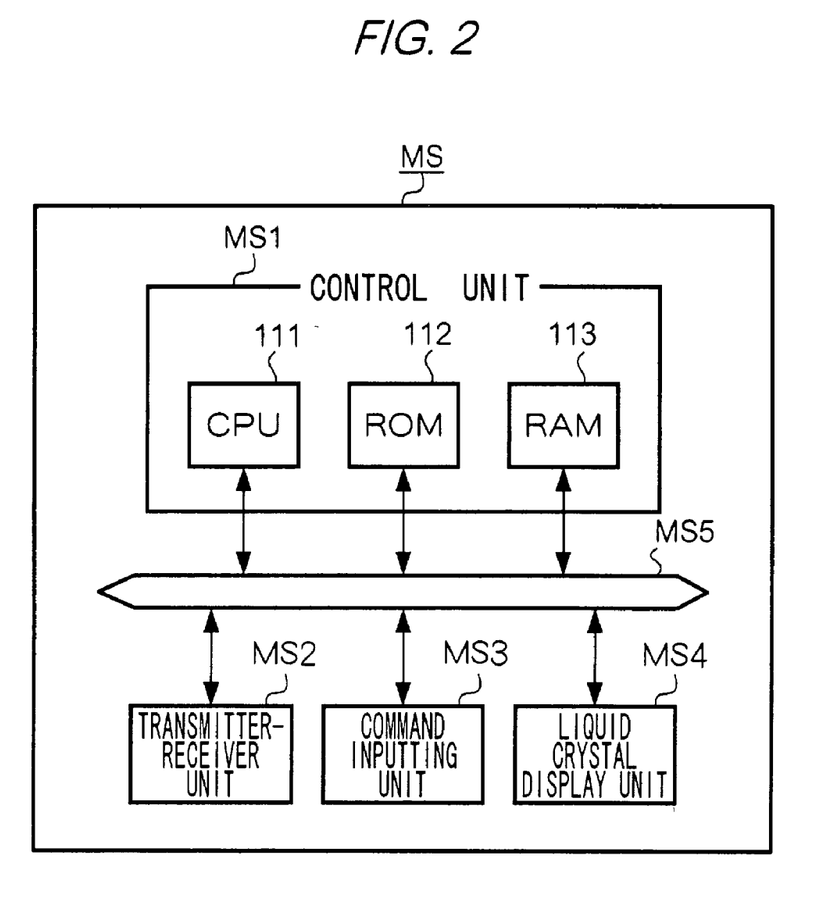
FIG. 2 is a block diagram showing the configuration of mobile station MS.

FIG. 2 is a block diagram showing the configuration of mobile station MS according to the first embodiment. As shown in FIG. 2, mobile station MS comprises a control unit MS1, a transmitter-receiver unit MS2, a command inputting unit MS3, a liquid crystal display unit MS4 and a bus MS5 which interconnects the above units.

Transmitter-receiver unit MS2 performs radio communications with base station BS on mobile packet communication network MPN. Command inputting unit MS3 is equipped with various buttons such as a PB (push button) and a cursor key; and when an inputting operation is performed by a user, command inputting unit MS3 supplies CPU 111 of control unit MS1 with operation data corresponding to the inputting operation. CPU 111 determines an inputting command on the basis of the inputting operation of the user and performs control corresponding to the inputting command. Liquid crystal display unit MS4 is composed of a display device such as a liquid crystal panel, and under the control of control unit MS1, displays various information. Control unit MS1 is composed of CPU 111, a ROM 112 and a RAM 113 and controls each unit of mobile station MS. ROM 112 stores a mobile station ID for uniquely specifying mobile station MS in mobile packet communication network MPN, a control program or various control information for controlling throughout mobile station MS and a WWW browser program for obtaining data from IP server W and displaying a character and an image. RAM 113 is used as a work area of CPU 111. CPU 111 carries out various kinds of processing by reading out various control programs stored in ROM 112. For example, when CPU 111 reads out a WWW browser stored in ROM 112, and the user inputs a URL by way of command inputting unit MS3, CPU 111 transmits a GET request of HTTP including the URL to mobile packet communication network MPN. Further, when HTML data corresponding to the GET request is returned from IP server W or gateway server GWS, CPU 111 writes the HTML data in RAM 113 and displays the image represented by the data in liquid crystal display unit MS4.

(3) Configuration of Gateway Server GWS

Figure 3:
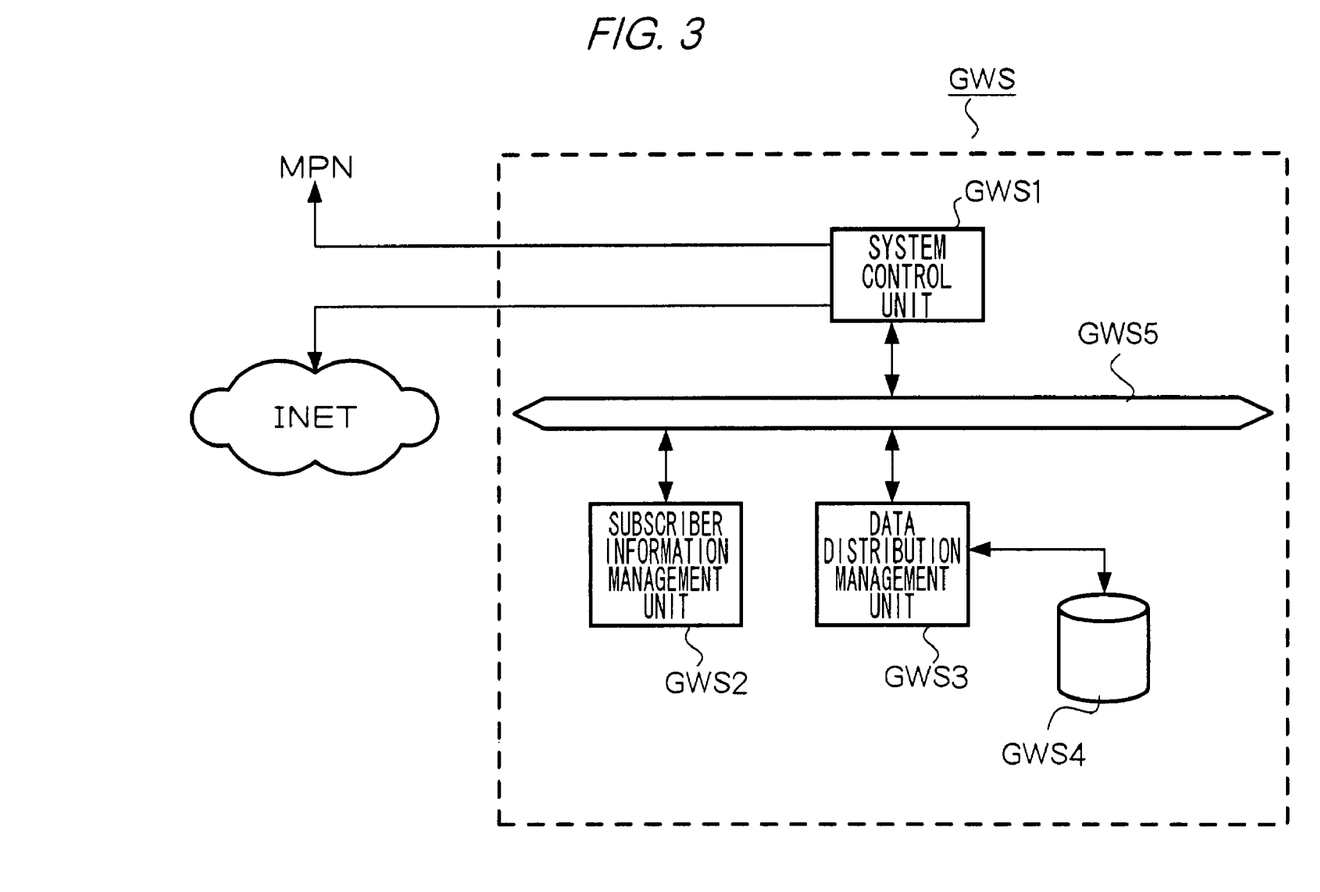
FIG. 3 is a block diagram showing the configuration of gateway server GWS.

FIG. 3 is a block diagram showing the configuration of gateway server GWS. As shown in FIG. 3, gateway server GWS comprises a system control unit GWS1, a subscriber information management unit GWS2, a data distribution management unit GWS3 and a bus GWS5 interconnecting these units.

Subscriber information management unit GWS2 stores and manages information relating to a subscriber of a packet communication service using mobile packet communication network MPN (for example, a telephone number or a mail address of each mobile station MS, attribute information of a subscriber and so on). System control unit GWS1 controls each unit of gateway server GWS and functions as an interface between different networks and performs the protocol conversion between mobile packet communication network MPN and Internet INET or other networks. System control unit GWS1, upon receiving a GET request from mobile station MS in mobile packet communication network MPN, carries out a search for a URL included in the GET request, and, in the case that the URL is a general URL on Internet INET (for example, a URL showing an information resource location in IP server W), and system control unit GWS1 converts the protocol of the GET request and transfers the converted protocol to Internet INET. Also, in the case that the URL included in the GET request represents an information resource location in gateway server GWS, system control unit GWS1 transmits the GET request to data distribution management unit GWS3. Data distribution management unit GWS3 stores information such as a home page or a web page to be distributed to mobile station MS and, according to a GET request transmitted from system control unit GWS1, distributes data corresponding to the GET request to mobile station MS. For example, in case that the GET request including the URL corresponding to a home page of gateway server GWS is transmitted from mobile station MS, data distribution management unit GWS3, according to the GET request, distributes data in HTML format (hereinafter referred to as "menu data") to mobile station MS.

Figure 4A:
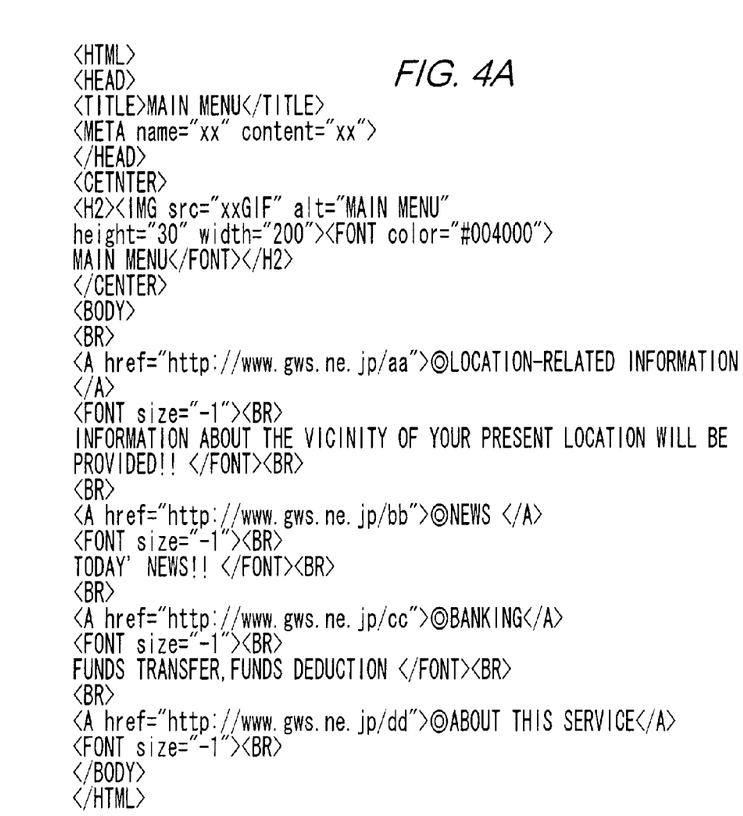
FIG. 4a is a diagram showing an example of a source of the main menu data.
Figure 4B:
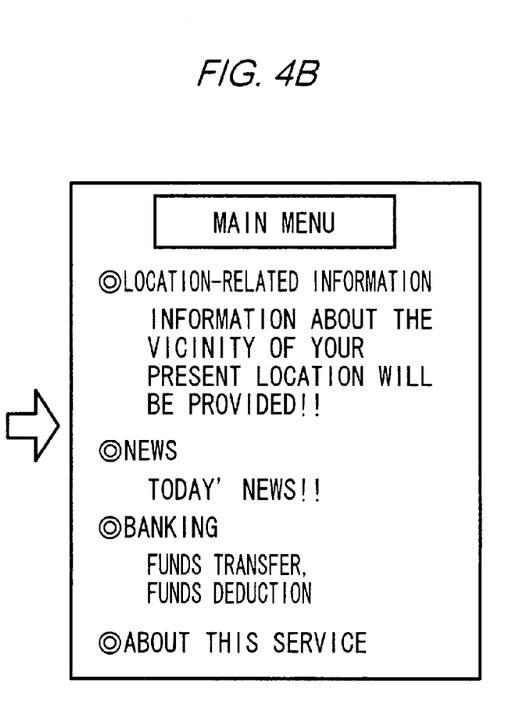
FIG. 4b is a diagram showing an example of a displayed image shown on liquid crystal display unit MS4 of a mobile station receiving the main menu data.

FIG. 4a is a diagram showing an example of a source of the menu data. FIG. 4b is a diagram showing an example of a displayed image shown on liquid crystal display unit MS4 of mobile station MS obtaining the menu data. In FIG. 4a, <A herf="" ></A>is an anchor tag and shows the URL of a service item which gateway server GWS can provide to mobile station MS (hereinafter referred to as "menu item").

The URL corresponding to each menu item shows a location of information in gateway server GWS (web page). When a GET request containing a URL included in the menu data is transmitted from mobile station MS, gateway server GWS returns submenu data corresponding to the URL. The submenu data is data in an HTML format such as menu data and includes the service information corresponding to each menu item (hereinafter referred to as "submenu item"). The data also includes the URL corresponding to each submenu item.

Specifically, as shown in FIG. 4b, when mobile station MS receives menu data, the character or the image representing each menu item, for example, "location-related information service", "news service" and so on is displayed. "Location-related information service" is the service for providing information about shops or facilities in the vicinity of mobile station MS. The submenu item of "location-related information service" includes "restaurant information", "movie theater information" and "shop information"; "restaurant information" includes restaurants in the vicinity of the user ("restaurant A", "restaurant B", . . . ) as well as information for acquiring information relating to these restaurants (URL, telephone number, etc.).

Figure 5:
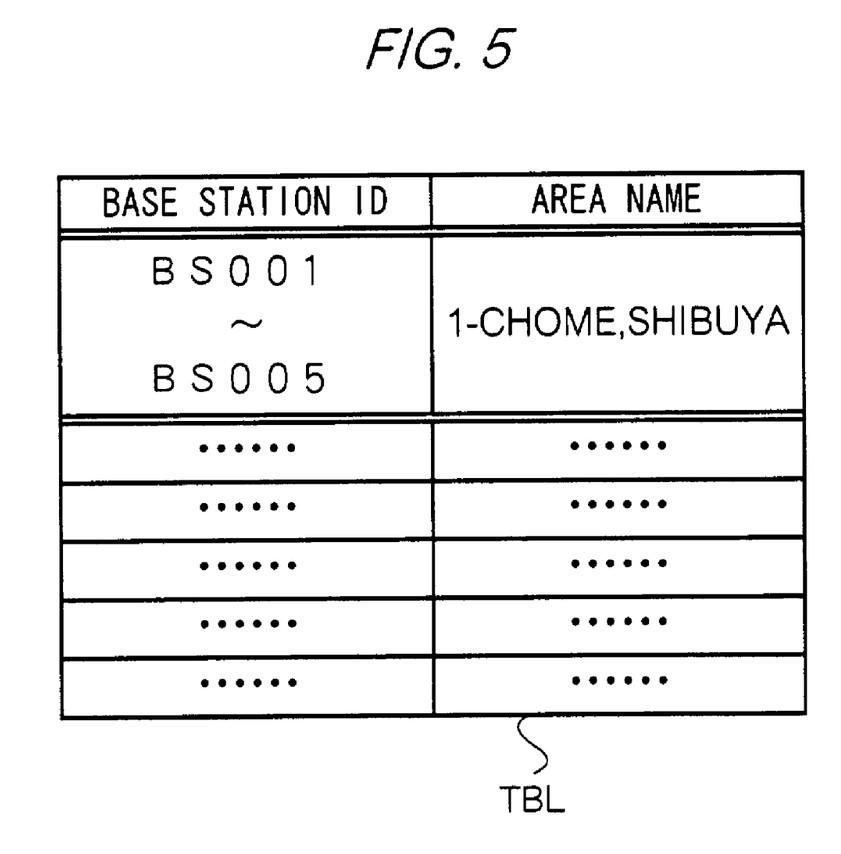
FIG. 5 is a diagram showing area name conversion table TBL.
Figure 6:
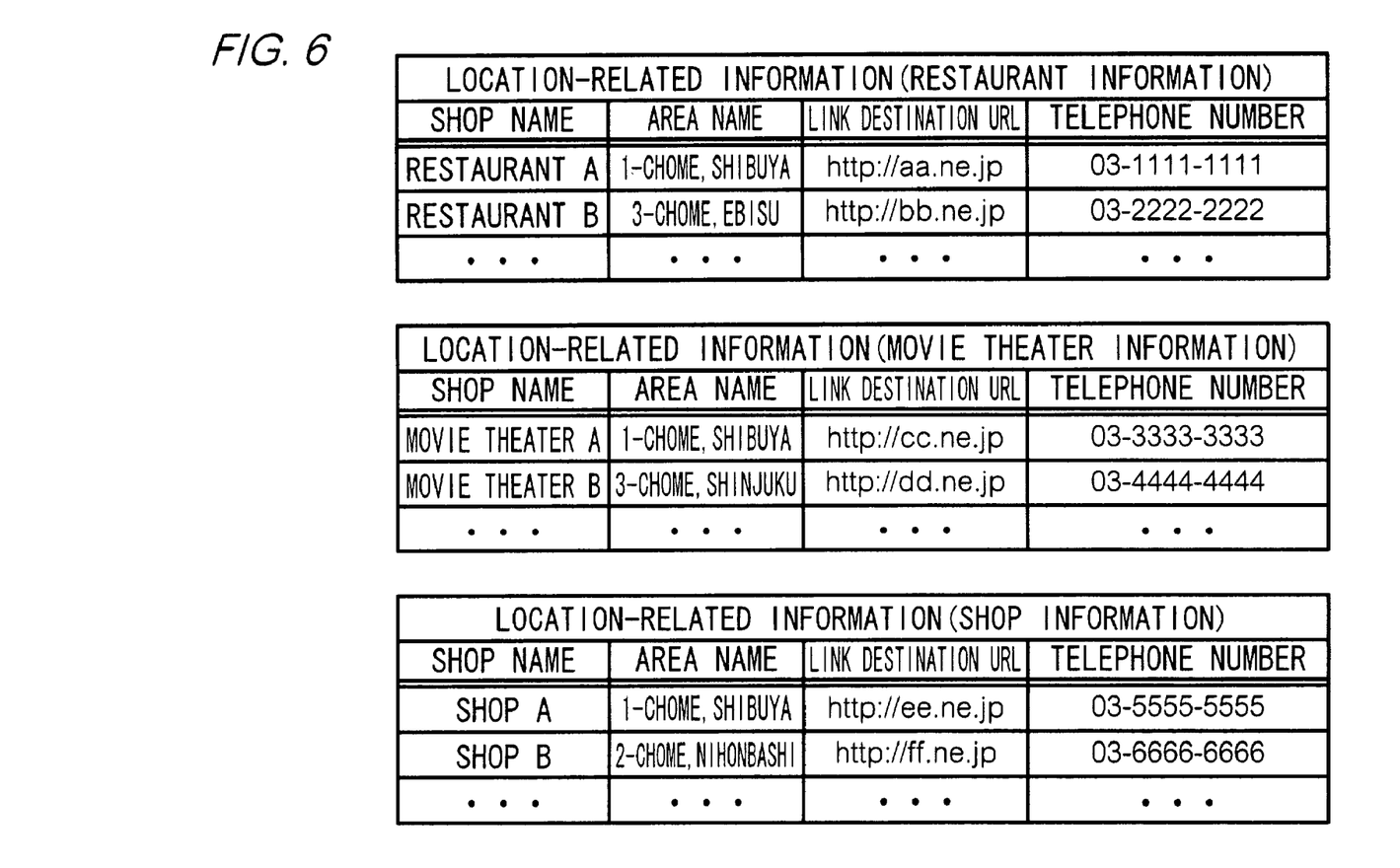
FIG. 6 is a diagram showing the memory content of location-related information database GWS4.

Data distribution management unit GWS3 includes area name conversion table TBL and location-related information database GWS4. FIG. 5 is a diagram showing area name conversion table TBL, and FIG. 6 is a diagram showing the memory content of location-related information database GWS4. As shown in FIG. 5, area name conversion table TBL stores the "base station ID" and the "area name" representing the area of base station BS which corresponds with the base station ID. For example, if the address of each of the items in base station ID group "BS001 to BS005" contains "1-chome, Shibuya, Shibuya-ku, Tokyo", "1-chome, Shibuya" as an area name is stored.

On the other hand, location-related information database GWS4, as shown in FIG. 6, stores location-related information corresponding to each submenu item which is composed of store names, area names of locations of shops, and a URL of a link site providing telephone numbers and other information of the shops. For example, in the case shown in FIG. 6, a shop name "restaurant A", an area name "1-chome, Shibuya", a URL "http://www.aa.nejp" and a telephone number "03-1111-1111" are stored as location-related information corresponding to the submenu item "restaurant information". Each area name stored in location-related information database GWS4 and each area name stored in area name conversion table TBL are area names classified by the same method.

Storing the location-related information may be performed by any of several methods. For example, IP server W may store information by accessing gateway server GWS, data distribution management unit GWS3 may access IP server W and extract a keyword relating to location-related information such as an area name or a shop name or the like and store the information in location-related information database GWS4. In this case, it is desirable that an update of information is performed periodically.

In the case that a GET request of HTTP transmitted from mobile station MS includes a URL of each submenu item of "location-related information service", data distribution management unit GWS3 extracts the base station ID which base station BS adds to the GET request. Further, data distribution management unit GWS3 reads out the area name from area name conversion table TBL, the area name corresponding to the base station ID extracted from the GET request. Data distribution management unit GWS3 extracts location-related information including the area name read out from location-related information database GWS4 and distributes the information to mobile station MS.

A data format of location-related information to be stored in location-related information database GWS4 can take an arbitrary form, but data transmitted from gateway server GWS to mobile station MS must be HTML data. Thus, in the case that the data format of location-related information is not in an HTML format, a conversion of the data format is performed by gateway server GWS.

[1.2] Operation of First Embodiment

The operation of the mobile communication system according to the present embodiment will be explained below. First, when the user performs a predetermined operation on command inputting unit MS3 of mobile station MS, CPU 111 reads out a WWW browser from ROM 112. Further, CPU 111, according to the WWW browser, carries out the processing for a packet registration for packet subscriber processing unit PS. The packet registration is the registration procedure for packet switching between mobile station MS and mobile packet communication network MPN.

Next, CPU 111 transmits a connection establishment request to mobile packet communication network MPN via transmitter-receiver unit MS2. The connection between mobile station MS and gateway server GWS is established, and mobile station MS can perform packet switching with gateway server GWS.

Figure 7:
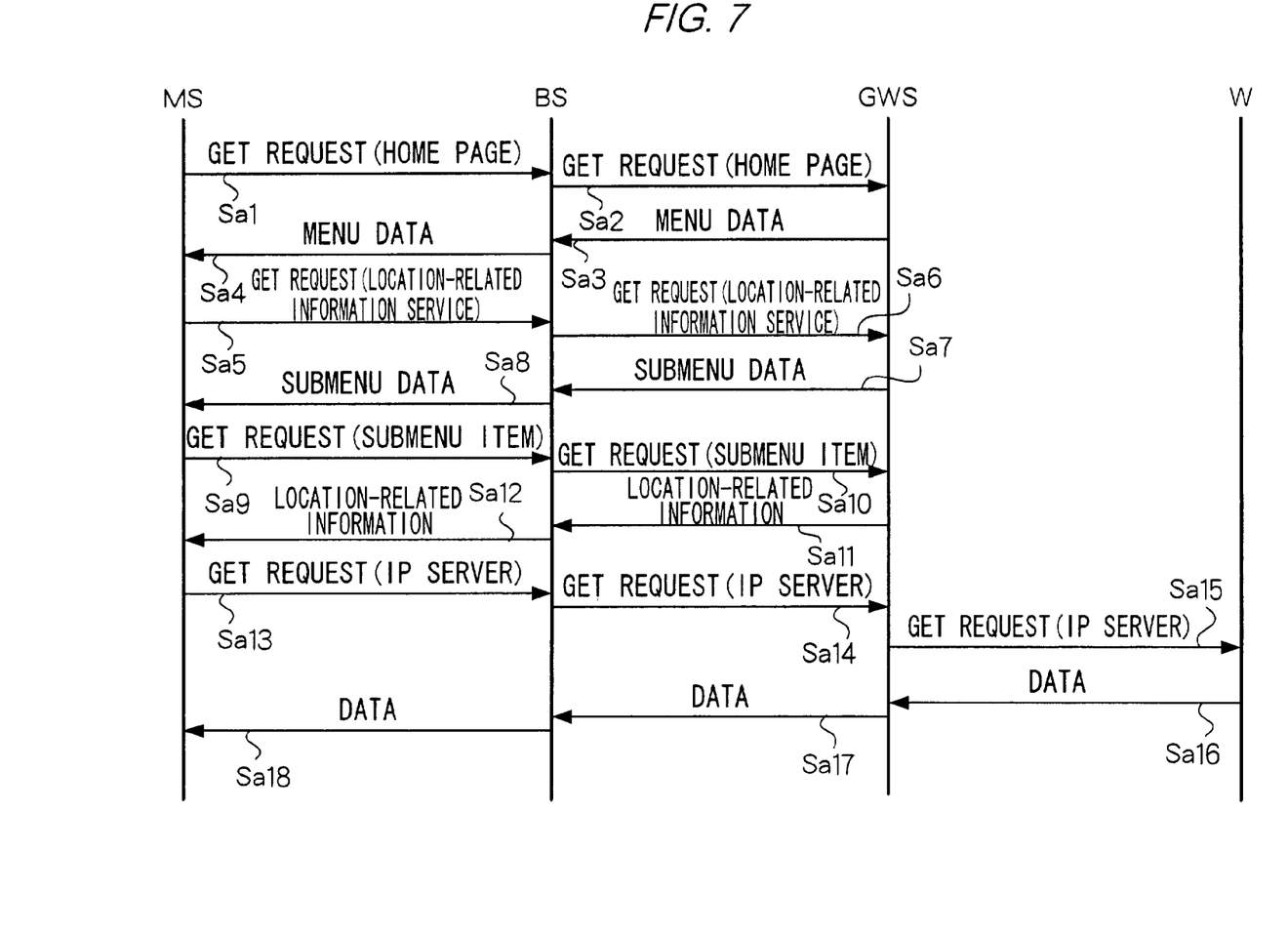
FIG. 7 is a diagram showing a sequence of a mobile communication system.

Then, the user inputs a URL of a home page of gateway server GWS by way of command inputting unit MS3 of mobile station MS, and the processing shown in FIG. 7 is carried out. First, CPU 111 of mobile station MS transmits the GET request of HTTP including the URL of the home page of gateway server GWS to transmitter-receiver unit MS2. Consequently, the GET request is transmitted to base station BS by transmitter-receiver unit MS2 (step Sa1). Base station BS receives the GET request and adds the base station ID of itself to the GET request and transmits the request to gateway server GWS (step Sa2).

System control unit GWS1 of gateway server GWS, upon receiving the GET request, determines that the URL included in the GET request represents its own home page and transmits the GET request to data distribution management unit GWS3. Data distribution management unit GWS3 which receives the GET request transmits menu data to system control unit GWS1. The menu data is transmitted from system control unit GWS1 to mobile station MS via base station BS (step Sa3).

Transmitter-receiver unit MS2 of mobile station MS, upon receiving the menu data, transmits the data to CPU 111 (step Sa4). Further, CPU 111 stores the menu data transmitted from transmitter-receiver unit MS2 in RAM 113, and displays in liquid crystal display unit MS4 an image corresponding to the menu data. That is, a list of services which mobile station MS can obtain, as shown in FIG. 4b, is displayed in liquid crystal display unit MS4.

In this situation, the user performs an inputting operation on command inputting unit MS3 to select the menu item "location-related information service", and CPU 111 extracts the URL corresponding to "location-related information service", that is "http://www.gws.ne.jp/aa", from the menu data. Further, CPU 111 transmits the GET request including the extracted URL to transmitter-receiver unit MS2. Then, the GET request is transmitted to gateway server GWS via base station BS by transmitter-receiver unit MS2 (steps Sa5, Sa6).

The GET request is received by system control unit GWS1 and transmitted to data distribution management unit GWS3. Data distribution management unit GWS3 extracts a URL from the GET request and determines that the URL is the URL corresponding to the menu item "location-related information service" and initiates the processing shown in FIG. 8.

Figure 8:
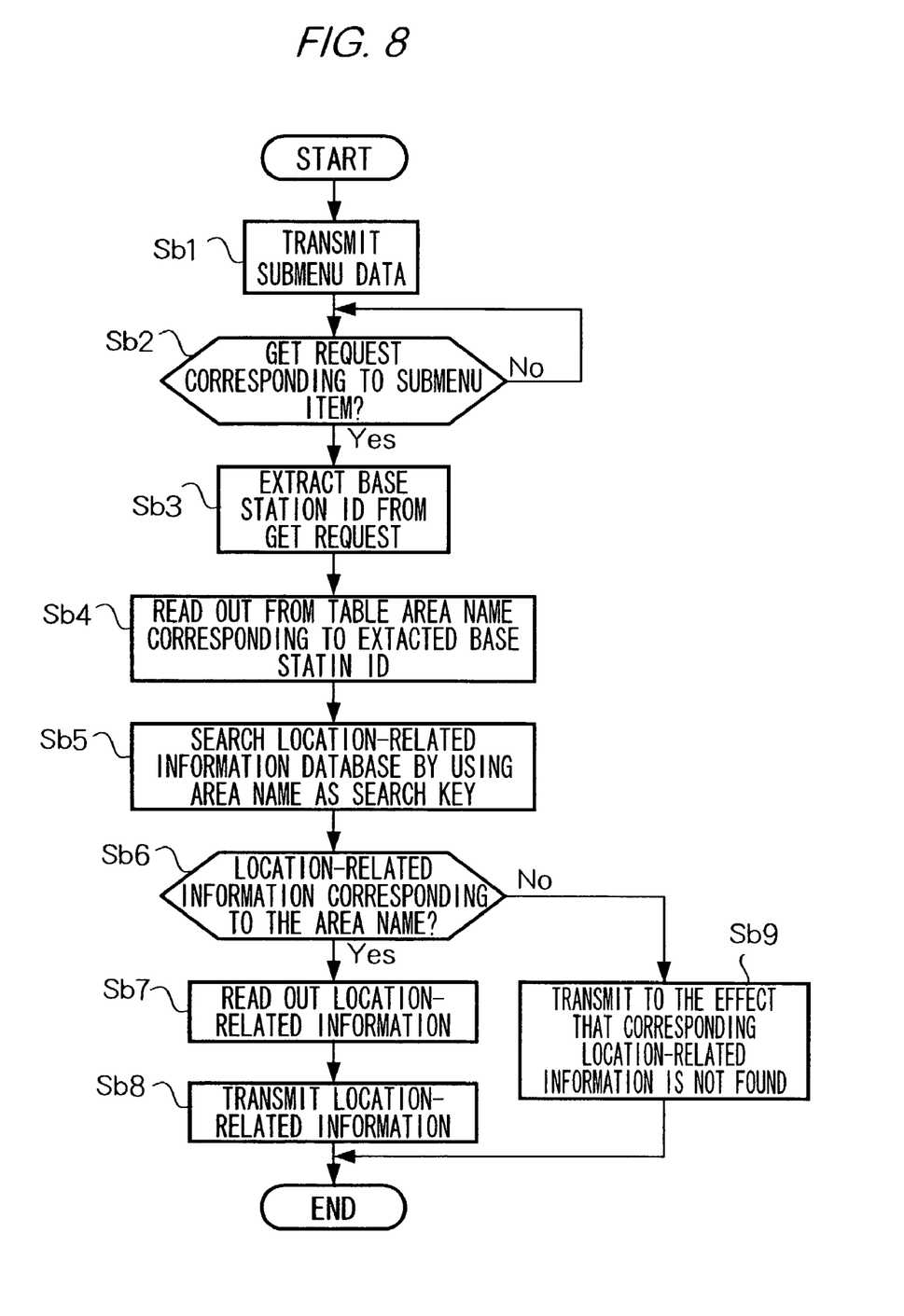
FIG. 8 is a flowchart showing the processing of data distribution management unit GWS3.

First, data distribution management unit GWS3 transmits the submenu data corresponding to the menu item "location-related information service" to system control unit GWS1 (step Sb1 in FIG. 8). System control unit GWS1 transmits the submenu data to mobile station MS via base station BS (steps Sa7, Sa8). Then, processing in data distribution management unit GWS3 goes to step Sb2 in FIG. 8. Until a next GET request including a URL corresponding to submenu item from mobile station MS is received, a determination in step Sb2 in FIG. 8 remains "No".

The submenu data transmitted from gateway server GWS is received by transmitter-receiver unit MS2 and transmitted to CPU 111. CPU 111 stores the submenu data in RAM 113 and displays the image represented by the data in liquid crystal display unit MS4.

Figure 9:
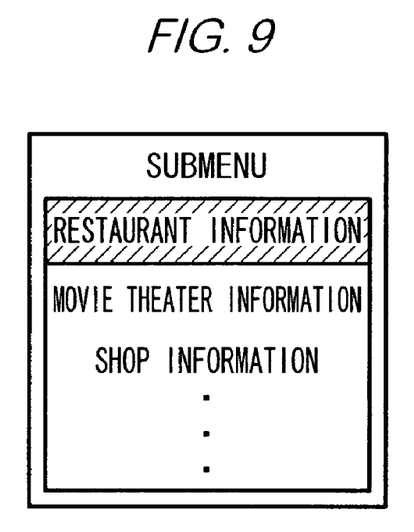
FIG. 9 is a diagram showing an example of a displayed image of liquid crystal display unit MS4.

FIG. 9 is a diagram showing an example of an image displayed in liquid crystal display unit MS4 of mobile station MS at the time of receiving the submenu data. In the situation shown in FIG. 9, for example, the user operates the cursor key of command inputting unit MS3, and the submenu item selected provisionally is highlighted. In FIG. 9, "restaurant information" is provisionally selected. In this situation, the user presses the decision button of command inputting unit MS3, and CPU 111 reads out the URL corresponding to "restaurant information" and transmits the GET request of HTTP including the URL to base station BS (step Sa9).

Base station BS, upon receiving the GET request transmitted from mobile station MS, adds its own base station ID to the GET request and transmits the request to gateway server GWS (step Sa10).

Then, the GET request transferred from base station BS is received by system control unit GWS1 and transmitted to data distribution management unit GWS3. In this manner, the GET request including the URL corresponding to the submenu item "restaurant information" is transmitted from system control unit GWS1, and a determination in step Sb2 in FIG. 8 becomes "Yes". Next, data distribution management unit GWS3 extracts the base station ID from the GET request (step Sb3 in FIG. 8).

Then, data distribution management unit GWS3 reads out the area name corresponding to the base station ID extracted from area name conversion table TBL (step Sb4 in FIG. 8). For example, in the case that the base station ID is "BS001", the area name "1-chome, Shibuya" is read out (see FIG. 5).

Next, data distribution management unit GWS3, using the area name "1-chome, Shibuya" as a search key, searches location-related information database GWS4 for location-related information corresponding to "restaurant information" (step Sb5 in FIG. 8).

In a case that the corresponding location-related information does not exist, a determination in step Sb6 in FIG. 8 becomes "No". In which case, data distribution management unit GWS3 transmits to mobile station MS (step Sb9 in FIG. 8) the fact that the corresponding location-related information does not exist. As a result, a message such as "corresponding information is not found" or the like is displayed in liquid crystal display unit MS4 of mobile station MS.

In the case that the corresponding location-related information exists (step Sb6 "Yes" in FIG. 8), that is, in the case that the location-related information including "1-chome, Shibuya" as an area name exists, data distribution management unit GWS3 transmits the location-related information to system control unit GWS1 for transmission to mobile station MS (steps Sb7, Sb8 in FIG. 8).

For example, in the case that the location-related information stored in location-related information database GWS4 is the content as shown in FIG. 6, data distribution management unit GWS3 reads out location-related information corresponding to "restaurant A" or the like, that is the URL of a site providing information relating to "restaurant A" and a telephone number and so on of "restaurant A", as location-related information corresponding to "1-chome, Shibuya" (step Sb7 in FIG. 8) and transmits the information to system control unit GWS1 (step Sb8 in FIG. 8). The URL and the telephone number, etc. are transmitted to mobile station MS via base station BS (steps Sa11, Sa12).

The location-related information transmitted from gateway server GWS is received by transmitter-receiver unit MS2 and transmitted to CPU 111. Then, CPU 111 writes the location-related information transmitted from transmitter-receiver unit MS2 in RAM 113 and displays the image of the location-related information in liquid crystal display unit MS4.

Figure 10:
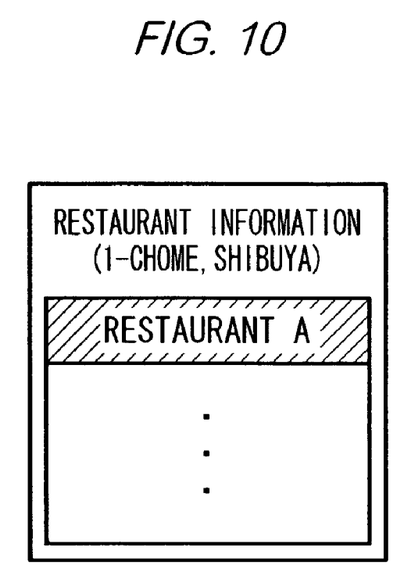
FIG. 10 is a diagram showing an example of a displayed image of liquid crystal display unit MS4.

FIG. 10 is a diagram showing an example of an image displayed in liquid crystal display unit MS4 of mobile station MS.

"Restaurant A" is provisionally selected, and a character string of "restaurant A" is highlighted. The user then presses the decision button of command inputting unit MS3, and CPU 111 reads out the URL corresponding to "restaurant A", that is "http://www.aa.ne.jp" (see FIG. 6), and transmits the GET request of HTTP including the URL to transmitter-receiver unit MS2. Consequently, the GET request is transmitted to gateway server GWS via base station BS by transmitter-receiver unit MS2 (steps Sa13, Sa14).

System control unit GWS1 of gateway server GWS, upon receiving the GET request, determines that the URL included in the GET request is not its own URL and transfers the GET request to Internet INET (step Sa15).

IP server W, upon receiving the GET request transferred to Internet INET, returns HTML data corresponding to the URL included in the GET request (in this case, HTML data relating to "restaurant A") to Internet INET. As a result, the HTML data is transmitted to mobile station MS via gateway server GWS (steps Sa16, Sa17, Sa18).

In this manner, a gateway server in the mobile communication system according to the present embodiment, using the base station ID of a base station including a mobile station, acquires the present location of the mobile station and transmits the location-related information corresponding to the present location. Thus, the user can acquire information relating to the present location provided by an IP server without transmitting the present location of the user to an IP server (i.e. without distributing the present location on the Internet).

[1.3] Modifications

<Modification 1-1>

According to the present embodiment, gateway server GWS, using the base station ID included in a signal transmitted from mobile station MS, acquires the present location of the user. The invention is not limited to the procedure of acquiring location information. It is also possible to acquire the present location of the user by installing a GPS in mobile station MS and transmit the latitude and longitude of the present location acquired by using the GPS to the gateway server GWS. In this case, information of the latitude and longitude corresponding to each area name instead of a base station ID is stored in area name conversion table TBL.

Another method would be to equip mobile station MS with a function for measuring the electrical field reception strength and the electrical field reception strength of beacon signals transmitted from three different base stations and transmit the discrete values of the measured strengths of the two electric field receptions and the base station ID to gateway server GWS. In this case, gateway server GWS computes the present location of mobile station MS on the basis of the transmitted electrical field reception strength and the base station ID. Alternatively, a method for classifying each area may be based not only on an address but also on a zip code, latitude, longitude, and so on.

<Modification 1-2>

According to the present embodiment, location-related information database GWS4 is installed in gateway server GWS, and retrieval of location-related information is performed in gateway server GWS. But, the location-related information database may also be installed in the retrieval server on Internet INET and the retrieval server may search for location-related information.

In this case, gateway server GWS, after reading out the area name corresponding to a base station ID, transmits only the area name to the retrieval server on Internet INET. The retrieval server, using the area name transmitted in this manner as a search key, performs a retrieval and returns the extracted location-related information to gateway server GWS. Gateway server GWS transmits the location-related information returned from the retrieval server to mobile station MS. At this stage, data distribution management unit GWS3 may use a predetermined code or the like to link the location-related information transmitted from the retrieval server with mobile station MS which has requested the location-related information.

Specifically, for example, in the case that the GET request corresponding to the submenu item "restaurant information" is transmitted from mobile station MS, data distribution management unit GWS3 produces the predetermined code for the GET request and adds the correspondent code to an area name and transmits the area name to the retrieval server. The retrieval server adds the correspondent code to the extracted location-related information and transmits the information. Then, data distribution management unit GWS3 specifies which mobile station MS will receive the location-related information based on the correspondent code and transmits the information to mobile station MS.

In this manner, a configuration that allows a retrieval of information to be performed in the retrieval server on the Internet enables the gateway server to reduce the burden of processing. Alternatively, only an area name and a correspondent code are transmitted to Internet INET. Because information by which the user can be specified does not exist, if another person illegally acquires an area name or a correspondent code on Internet INET, user privacy is protected.

[2] Second Embodiment

Figure 11:
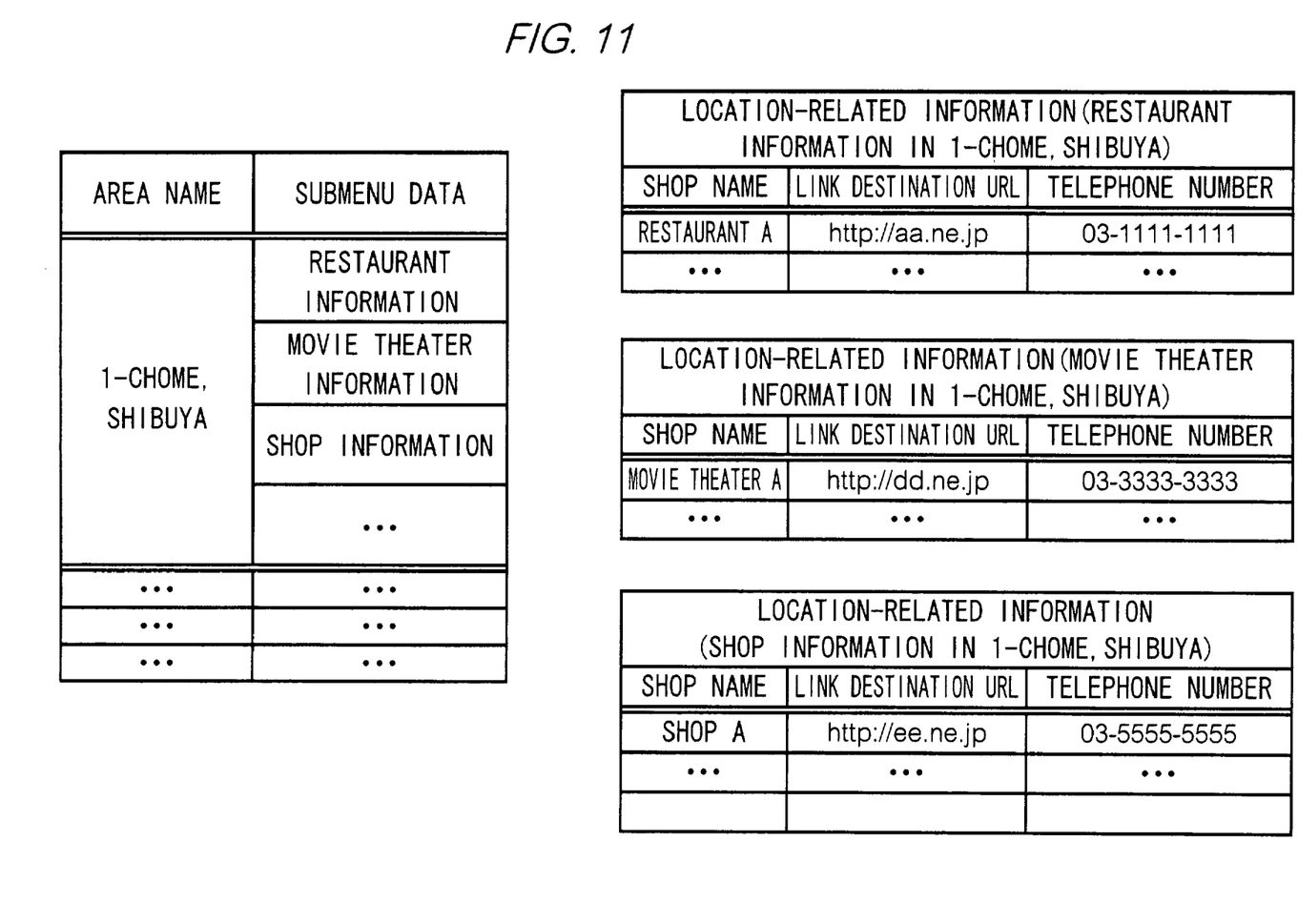
FIG. 11 is a diagram showing the memory content of location-related information database GWS4 according to the second embodiment.

Because the configuration and the operation of the mobile communication system according to the second embodiment is the same as those of the first embodiment, an explanation will be omitted. The method of storing information in location-related information database GWS4 is different from that of the first embodiment. FIG. 11 is a diagram showing the memory content of location-related information database GWS4 according to the second embodiment. Unlike the first embodiment shown in FIG. 6, location-related information database GWS4 according to the second embodiment stores unalike submenu data corresponding to each area name stored in area name conversion table TBL. Specifically, the data of submenu items corresponding to the area name "1-chome, Shibuya" includes "restaurant information", "movie theater information", "shop information" and so on; and the submenu item "restaurant information", for example, stores information relating to restaurants in "1-chome, Shibuya, the URL of a site providing information relating to "restaurant A" or the telephone number of "restaurant A", etc.

Location-related information database GWS4 according to the present embodiment has a submenu item for every area name; on acquiring an area name gateway server GWS can quickly read out corresponding location-related information. That is, unlike in the first embodiment, using an area name as a search key is not needed in the second embodiment for searching location-related information database GWS4. Thus, the burden of processing associated with the retrieval function in the gateway server is reduced, and the second embodiment makes possible a quick response to a request of location information by the user.

The invention is not limited to specific configurations of the above-mentioned embodiments and can take various forms within the confines of claims.

What is claimed is:

1. A gateway server communicating with a plurality of mobile terminals via a first network and communicating with a plurality of information provider servers via a second, public network, comprising:

a menu data control that sends a mobile terminal via the first network at least one set of menu data to guide a user of the mobile terminal, through at least one round of menu selection process, to said menu selection for requesting location-related information that the user is interested in obtaining, wherein at least one of the at least one set of the menu data is accessible by the gateway server;

a request transmission control that receives a request for the location-related information from the mobile terminal via the first network, wherein the request comprises an identification of a base station to which the mobile terminal is connected and a network address attributed to an information provider server, and sends at least a part of the request via the second network to the information provider server;

an area name finder that uses the identification of the base station to obtain an area name indicative of a geographical location of the base station, wherein the area name finder obtains the area name before the request transmission control sends the at least a part of the request to the information provider server, and informs the information provider server of the area name via the second network, wherein the information provider server uses the area name to obtain the location-related information regarding a geographical area stored in relation to the area name; and an information transmission control that receives from the information provider server via the second network at least a part of the location-related information and sends at least a part of the received information to the mobile terminal via the first network.

2. A gateway server according to claim 1, wherein there is more than one set of menu data, and a selection from one set of menu data leads to a next set of menu data.

3. A gateway server according to claim 1, wherein the area name finder informs the information provider server of the area name when the request transmission control sends the request to the information provider server.

4. A gateway server according to claim 1, wherein the base station adds the identification of its to the request from the mobile terminal.

5. A gateway server according to claim 1, wherein the identification of the base station is determined based on signal reception by the motile terminal from the base station.

6. A gateway server according to claim 1, wherein the request transmission control sends at least a part of the request to the information provider server, along with an identification of the mobile terminal.

7. A gateway server according to claim 1, wherein the area name comprises a character string indicative of the area name.

8. A gateway server according to claim 1, wherein the area name comprises an identification of a street number and name.

9. A gateway server according to claim 1, wherein the location-related information regarding the geographical area comprises location information of at least one location where a service of interest is available in the geographical area.

10. A gateway server according to claim 1, wherein the area name finder determines the area name by accessing a table that correlates the identification of the base station to its corresponding area name.

11. A gateway server communicating with a plurality of mobile terminals via a first network and communicating with a plurality of information provider servers via a second, public network, the gateway server implementing the logic of:

sending a mobile terminal via the first network at least one set of menu data to guide a user of the mobile terminal, through at least one round of menu selection process, to said menu selection for requesting the location-related information that the user is interested in obtaining, wherein at least one of the at least one set of the menu data is accessible by the gateway server;

receiving a request for the location-related information from the mobile terminal via the first network, wherein the request comprises an identification of a base station to which the mobile terminal is connected and a network address attributed to an information provider server;

sending at least a part of the request via the second network to the information provider server;

using the identification of the base station to obtain an area name indicative of a geographical location of the base station before sending the at least a part of the request to the information provider server;

informing the information provider server of the area name via the second network, wherein the information provider server uses the area name to obtain the location-related information regarding a geographical area stored in relation to the area name;

receiving from the information provider server via the second network at least a part of the located-related information; and sending at least a part of the received information to the mobile terminal via the first network.

12. A gateway server according to claim 11, wherein there is more than one set of menu data, and a selection from one set of menu data leads to a next set of menu data.

13. A gateway server according to claim 11, wherein sending the request to the information provider server and informing the information provider server of the area name are performed concurrently.

14. A gateway server according to claim 11, wherein the base station adds the identification of its to the request from the mobile terminal.

15. A gateway server according to claim 11, wherein the identification of the base station is determined based on signal reception by the mobile terminal from the base station.

16. A gateway server according to claim 11, wherein sending at least a part of the request to an information provider server comprises sending at least a part of the request to an information provider server, along with an identification of the mobile terminal.

17. A gateway server according to claim 11, wherein the area name comprise a character string indicative of the area name.

18. A gateway server according to claim 11, wherein the area name comprises an identification of a street number and name.

19. A gateway server according to claim 11, wherein the location-related information regarding the geographical area comprises location information of at least one location where a service of interest is available in the geographical area.

20. A gateway server according to claim 11, wherein obtaining an area name comprises accessing a table that correlates the identification of the base station to its corresponding area name.

* * * * *

UNITED STATES PATENT AND TRADEMARK OFFICE
CERTIFICATE OF CORRECTION

| | |
|---|---|
| PATENT NO. | : 7,209,756 B2 |
| APPLICATION NO. | : 10/182423 |
| DATED | : April 24, 2007 |
| INVENTOR(S) | : Toshiyasu Yabe et al. |

It is certified that error appears in the above-identified patent and that said Letters Patent is hereby corrected as shown below:

<u>On the Title Page</u>

Page 2, in column 2, line 15, under "OTHER PUBLICATIONS", after "3G TS" delete "23171" and substitute --23.171-- in its place.

Page 2, in column 2, line 19, under "OTHER PUBLICATIONS", before "Working group 2" delete "Ran;" and substitute --RAN;-- in its place.

Page 2, in column 2, under "OTHER PUBLICATIONS" insert the following:

--Norwegian Office Action dated Sept. 27, 2006.
  Canadian Office Action dated Mar. 2, 2007.--.

<u>In the Claims</u>

Column 11, in claim 4, line 2, after "identification of" delete "its" and substitute --itself-- in its place.

Column 11, in claim 5, line 3, after "reception by the" delete "motile" and substitute --mobile-- in its place.

Column 12, in claim 14, line 2, after "identification of" delete "its" and substitute --itself-- in its place.

Column 13, in claim 17, line 2, after "area name" delete "comprise" and substitute --comprises-- in its place.

Signed and Sealed this

Fourth Day of September, 2007

JON W. DUDAS
*Director of the United States Patent and Trademark Office*